B. O. WALKER.
CAMERA.
APPLICATION FILED JUNE 4, 1907.

910,750.

Patented Jan. 26, 1909.

2 SHEETS—SHEET 1.

Inventor
Bertram O. Walker,

Witnesses

By Victor J. Evans
Attorney

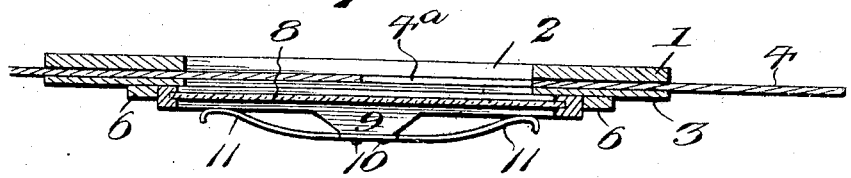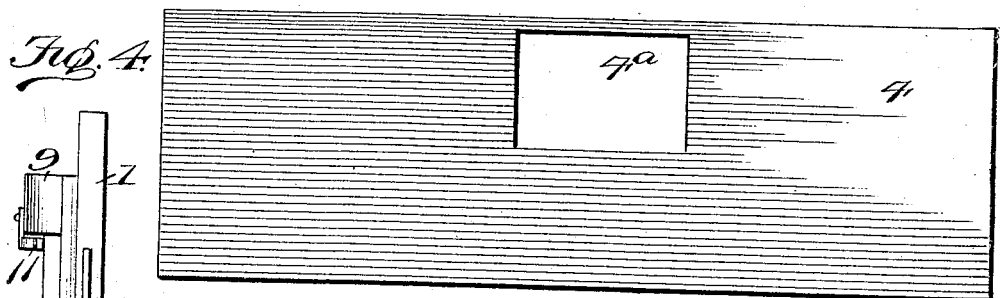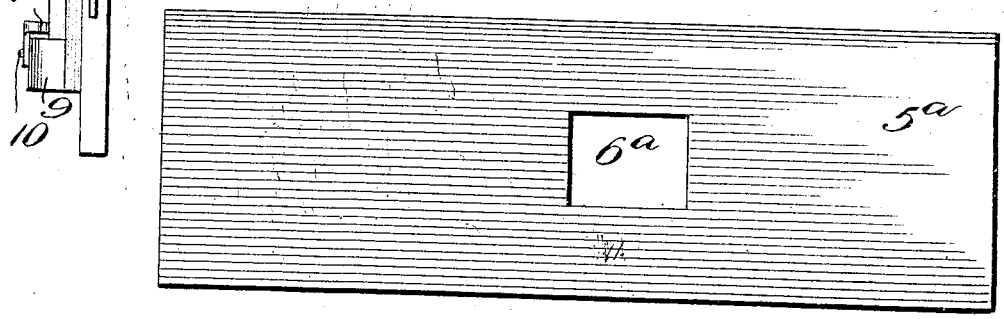

UNITED STATES PATENT OFFICE.

BERTRAM O. WALKER, OF TACOMA, WASHINGTON.

CAMERA.

No. 910,750.   Specification of Letters Patent.   Patented Jan. 26, 1909.

Application filed June 4, 1907. Serial No. 377,230.

*To all whom it may concern:*

Be it known that I, BERTRAM O. WALKER, a citizen of the United States of America, residing at Tacoma, in the county of Pierce and State of Washington, have invented new and useful Improvements in Cameras, of which the following is a specification.

This invention relates to cameras, and one of the principal objects of the same is to provide simple and reliable means for making a number of exposures upon a single plate by means of a reversible slide having an exposure opening thereon, and adapted to be moved horizontally across the plate at the top and then reversed for moving across the bottom of the plate.

Another object of the invention is to provide a camera back with a guideway through which slides may be passed from either side, the slides being reversible so that the exposure opening may be disposed at the top or bottom of the plate to form a series of pictures thereon, while a separate plate having a centrally disposed opening may be utilized for making exposures in a line horizontally central to the plate.

Figure 1:
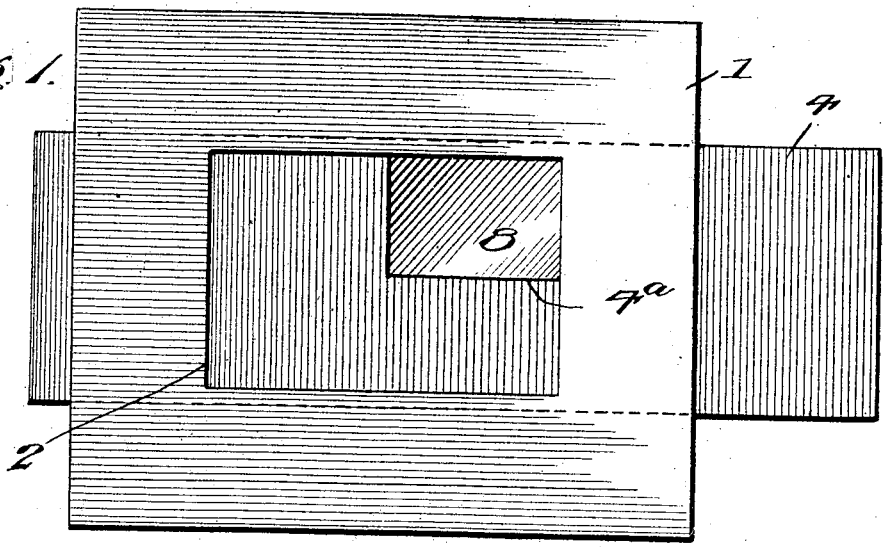
Figure 2:
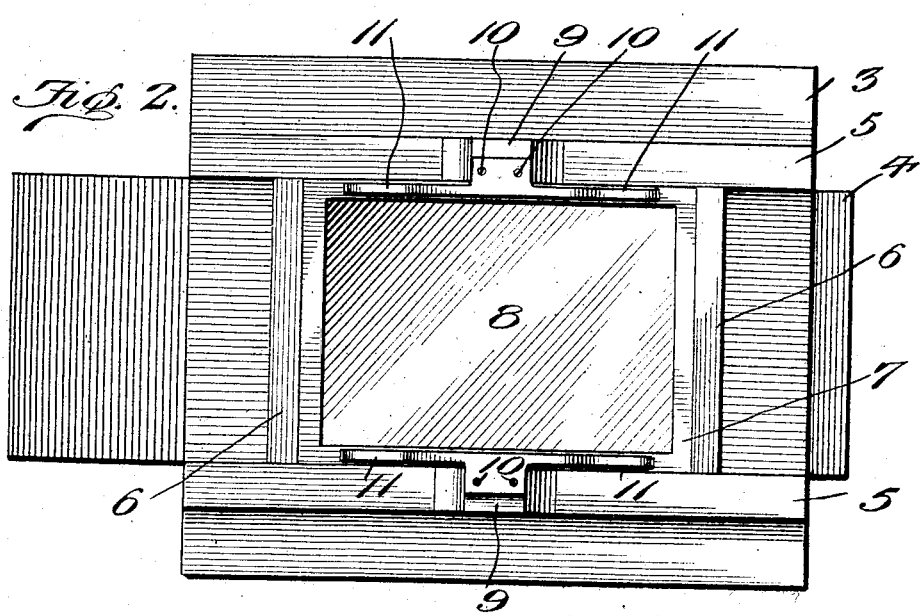

These and other objects may be attained by means of the construction illustrated in the accompanying drawings, in which:

Figure 1 is a front elevation of a camera back made in accordance with my invention, and showing an exposure slide mounted therein. Fig. 2 is a rear elevation of the same. Fig. 3 is a central longitudinal section of the same. Fig. 4 is an end view of the same. Fig. 5 is a plan view of one of the reversible slides. Fig. 6 is a similar view of another slide, which may be utilized in carrying out my invention.

Referring to the drawings for a more particular description of my invention, the numeral 1 represents the frame of the camera back provided with an opening 2, and secured to the frame 1 is a similar frame 3 which is spaced from the frame 1 sufficiently to form a guideway between them for the slides 4. Longitudinal strips 5 are secured to the frame member 3, and vertical guide strips 6 extend between the strips 5, thus forming an intermediate space in which is fitted the frame 7, having a ground glass pane 8 therein. Projecting out from the center of the strip 5 is a boss 9, and secured centrally to said boss by means of the screws 10, is a double leaf spring 11 for holding the ground glass in place.

The slide 4 is provided with an opening 4ª therein and is designed to be used with the plate holder by placing the same in the guideway between the members 1 and 3 with the exposure opening 4ª located at one corner of the ground glass 8. After the exposure has been made at this point, the slide 4 is moved to the opposite side or corner of the glass 8, and after this exposure has been made, the slide 4 is inverted or reversed to make exposures at the bottom of the plate. In this way four exposures are made, as shown in the drawing, but it will be understood that any number of openings of the required sizes in the slides may be utilized depending upon the character of the work to be done.

In cases where a line of pictures through the center of the plate are to be produced, a slide 5ª, as shown in Fig. 6, is provided with a central opening 6ª which will produce a central line of pictures upon the plate. Such a slide may be used in case that it is required to make small pictures in three horizontal lines across the film in which case a slide similar to 4 would be used for the four corner pictures, and a slide having a smaller opening for the two central outside pictures would be utilized, the slide 5ª being used for producing the central line of exposures.

As shown in Fig. 4 the frame is provided with a slot for the slides instead of being formed of two separate members 1 and 3, as shown in the other figures.

From the foregoing it will be obvious that by using separate slides I can produce the required number of pictures upon the same plate by merely moving the slides and reversing them from either side of the plate holder.

My invention is of a simple character, is comparatively inexpensive to produce and is quick and reliable in operation.

Having thus described the invention, what I claim is:

A back for photographic cameras having an opening therein, a frame secured in spaced relation to the back to form a guideway, a slide mounted in the guide-way and having an opening therein of a reduced area to the opening formed in the back, longitudinal strips secured to the frame, vertical guide strips extending between the longitudinal strips, a removable frame mounted between the strips, a ground glass fitted in the frame, and photographic plate holding springs carried by said removable frame.

In testimony whereof, I affix my signature in presence of two witnesses.

BERTRAM O. WALKER.

Witnesses:
 W. B. SHORT,
 F. J. ALLEN.